United States Patent Office 2,901,049
Patented Aug. 25, 1959

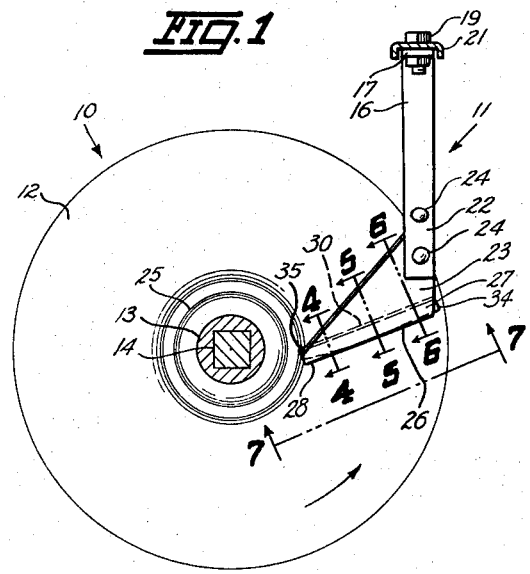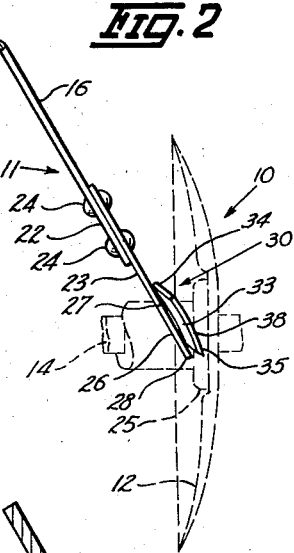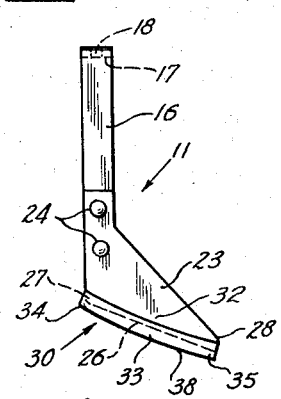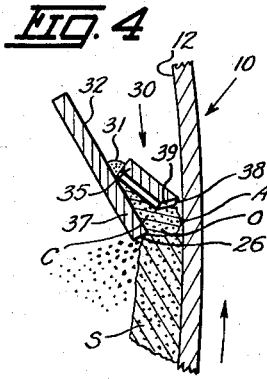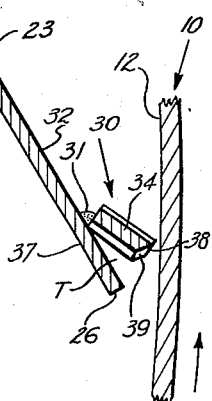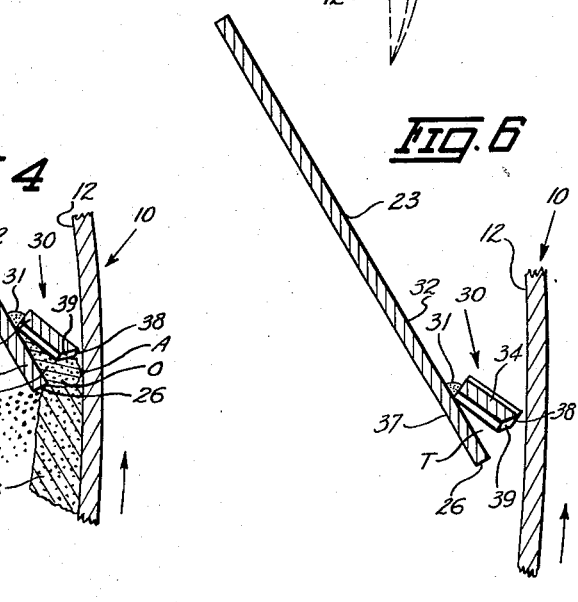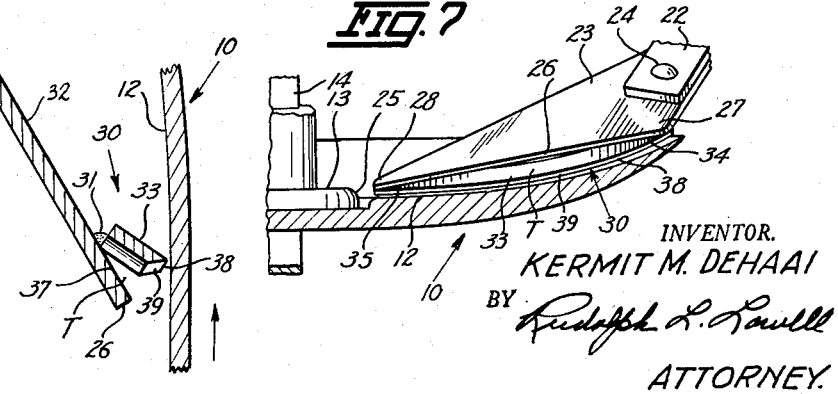

2,901,049
SCRAPER DEVICE FOR A FARM DISC
Kermit M. De Haai, Monroe, Iowa
Application June 3, 1957, Serial No. 663,275
1 Claim. (Cl. 172—558)

This invention relates to agricultural implements of a disc type and particularly to an improved scraping device for cleaning a disc. More particularly, the invention concerns a scraping device in which a portion of the earth being disced is continuously trapped and used to abrade and clean a surface of the disc.

Present day scraping devices for cleaning and polishing an inner concave side of a conventional disc usually comprise a scraper blade which is rigidly suspended from a part of the discing implement or apparatus. The scraper blade has a lower working edge positioned at an angle relative to the concave side of the disc so as to be in a contacting relation with a radial part of the concave side of the disc. The working edge functions to scrape the soil clinging to the concave side by a shearing action. This type of scraping device has not been entirely satisfactory since the contact engagement of the scraper with the disc does not efficiently clean and polish the disc. Instead, a marring or scarring of the surface of the disc occurs along with a wearing of the scraper blade working edge. Additionally, since the soil is not completely removed from the disc, it tends to pack and harden on the disc so as to eventually build up to a thickness to forcibly back the scraper blade away from the disc so as to diminish, and in some cases nullify the effectiveness of the scraper.

An object of this invention is to provide an improved scraper device for keeping a disc clean and unencumbered when in operation, especially in wet or clinging soil.

Another object of this invention is to provide a scraper device for cleaning a disc wherein the device does not contact the disc, thus obviating wear.

A further object of this invention is to provide a scraper device for cleaning a disc whereby the soil which is being cultivated is utilized by the device as a cleaning or abrading agent.

Another object of this invention is to provide a device for cleaning a disc which is economical to manufacture, effective in use, and rugged in structure.

These and other objects of the present invention will become readily apparent by reference to the following description and the accompanying drawings, wherein:

Fig. 1 is a side elevational view of a disc shown in assembly relation with a scraper device embodying the present invention;

Fig. 2 is an end elevational view of the assembly of Fig. 1 looking toward the left as viewed in Fig. 1, showing the relation of the scraper device to the disc unit, the latter being shown in phantom for the purpose of clarity;

Fig. 3 is a side elevational view of the scraper device, as seen looking from the rear of its showing in Fig. 1;

Figs. 4, 5 and 6 are enlarged cross-sectional views taken along the lines 4—4, 5—5 and 6—6, respectively, in Fig. 1; and Fig. 7 is an enlarged, fragmentary sectional view as seen along the line 7—7 in Fig. 1.

Referring first to Fig. 1, a conventional disc member 10, of a dish type usually embodied in a farm discing machine is shown in assembly relation with a scraper device 11 for cleaning the inside concave face 12 of the disc 10. The disc has a hub 13 formed at the center through which a rotatable shaft 14 is inserted. As is also usual, the disc 10 is rotated in response to its travel over a ground surface.

The scraper device 11 includes an arm 16 having an upper portion 17 (Fig. 2) bent angularly from the main portion of the arm 16, the portion 17 having an elongated slot 18 formed therein, through which a nut and bolt unit 19 is inserted to secure the arm 16 to a scraper arm support 21 which forms a part of the frame (not shown) of the discing machine. As the support 21 extends in a direction parallel with the direction of extension of the disc-supporting shaft 14, the slot 18 provides for lateral adjustment of the arm 16 relative to the disc 10 for a purpose hereinafter described.

A flat scraper blade 23 is securely attached to the lower portion 22 of the arm 16 by a pair of rivets 24. The scraper blade 23 is of a substantially right triangle shape with its base side or edge having a heel portion 27 and a toe portion 28, with the lower portion 22 of the arm 16 being secured to the blade 23 above the heel portion 27. Due to the particular angle between the upper bent portion 17 and the main portion of the arm 16, the suspension of the arm from the support 21 provides for the base edge 26 of the blade 23 being placed in a position adjacent to the concave face 12 of the disc with the toe portion 28 adjacent to the periphery 25 of the disc hub 13, and for a position of the arm 16 extended upwardly and away (Fig. 2) from the vertical plane of the disc 10 at an angle of less than forty-five degrees.

An elongated trap or trough-forming bar 30 of a relatively short width, and of a length approximately equal to the length of the edge 26 is secured, as by weldments 31, along the inner or upper face 32 of the blade 23 (Fig. 3) at a spaced distance above the base edge 26, as shown in Fig. 4. The central portion 33 (Fig. 5) of the bar 30, intermediate the ends 34 (Fig. 6) and 35 (Fig. 4) thereof which are in a contacting relation with the blade 23, is bowed slightly away from the face 32 of the blade so as to follow and be contiguous with a radial part of the concave surface 12 of the disc 10.

As best appears in Figs. 4–6, inclusive, a V-shaped trough or trap T is thus formed by the bar 30 and the opposite portion 37 of the blade 23, so that the trough T faces or is open (Fig. 7) in the direction counter to the rotation of the disc 10, as indicated by the arrows. By referring to Fig. 4, it may readily be seen that the part of the clinging soil S which extends outwardly from the surface 12 of the disc 10 a distance greater than the clearance O between the blade edge 26 and the concave surface 12, will be deflected or sheared from the remaining soil by the edge 26 and will fall away therefrom. The soil remaining on the disc surface 12, upon initial operation of the disc 10, enters the trough T to form a clod or soil pack C having an outer abrasive surface A which contacts an adjacent radial part of the concave surface 12 of the disc 10. The lower face 39 of the bar 30 is slightly beveled toward the trough T to aid in directing and trapping the soil within the trough T.

It has been found that the abrasive action of the surface A of the entrapped clod C against the disc surface 12 continually removes from the surface 12 any fresh soil that would tend to harden and pack thereon whereby the surface 12 is kept clean and highly polished. Of importance is the fact that neither the edge 26 of the blade 23 nor the edge 38 of the bar 30 contacts the surface 12 of the disc 10 (Fig. 7), so as to substantially eliminate any wear between these parts. Additionally, the agent which actually performs the cleaning and polishing of the surface 12 is the soil C that is trapped in the trough T. Obviously, should any of the clod or entrapped soil C fall from or be removed from the trough T, upon operation of the disc 10 the clod C would immediately be reformed for effective use as an abrading and cleaning agent for the disc.

It is to be noted that when the scraper device 11 is in assembled relation with the disc 10, the toe 28 of the blade and the end 35 of the bar 30 are in a lower or leading position than the respective opposite ends 27 and 34 (Fig. 1). This arrangement lends itself to a self-removal of foreign matter in the soil which would tend to prevent a complete abrasive surface A being formed, as the constant thrust of oncoming soil against the clod C would tend to force the foreign matter upwardly along and within the trap T, whereby it eventually would be dislodged at the heel or upper end of the trap.

Although only one embodiment of the invention has been disclosed herein, it is to be noted that various modifications and alternate constructions may be made within the full scope of the invention as defined in the appended claim.

I claim:

A cleaning and abrading device for the disc of a soil discing machine wherein the disc is of a concavo-convex shape and rotatably supported on a frame structure of the machine for rotation about a horizontal axis, said device including a support member secured to said frame member such that a lower blade portion of said support member is inclined downwardly and angularly toward the concave side of said disc, an edge of said lower blade portion extended substantially radially outwardly of said axis and being adjacent the surface of said concave side, and a soil-receiving V-shaped trough forming means including an elongated bar-like element secured along one side thereof to the side of said lower blade portion facing said concave side and at a spaced distance from said edge, said element extending angularly from said lower blade portion toward said concave side and being slightly bowed along the length thereof to lie in a contiguous relation closely abutting a radial portion of said concave side and substantially prevent the passage of soil between said element and said concave disc side, said trough forming means being open in a direction counter to the rotation of said disc, the lower face of said bar-like element being beveled in a direction to trap soil within said trough forming means, and the edge of said lower blade portion acting to shear soil adjacent the surface of said concave side, to trap the soil into a substantially triangular clod, the base of which contacts said concave disc side for cleaning and abrading purposes.

References Cited in the file of this patent
UNITED STATES PATENTS
2,045,762    Elliott _____ June 30, 1936